US012172871B2

(12) United States Patent
Yoneda

(10) Patent No.: US 12,172,871 B2
(45) Date of Patent: Dec. 24, 2024

(54) CRANE INFORMATION DISPLAY SYSTEM

(71) Applicant: TADANO LTD., Kagawa (JP)

(72) Inventor: Mizuki Yoneda, Kagawa (JP)

(73) Assignee: TADANO LTD., Kagawa (JP)

( * ) Notice: Subject to any disclaimer, the term of this patent is extended or adjusted under 35 U.S.C. 154(b) by 378 days.

(21) Appl. No.: 17/763,051

(22) PCT Filed: Sep. 25, 2020

(86) PCT No.: PCT/JP2020/036296
§ 371 (c)(1),
(2) Date: Mar. 23, 2022

(87) PCT Pub. No.: WO2021/060473
PCT Pub. Date: Apr. 1, 2021

(65) Prior Publication Data

US 2022/0356048 A1 Nov. 10, 2022

(30) Foreign Application Priority Data

Sep. 27, 2019 (JP) ................................ 2019-176782

(51) Int. Cl.
*G06T 7/00* (2017.01)
*B66C 13/40* (2006.01)
*B66C 23/90* (2006.01)

(52) U.S. Cl.
CPC ............ *B66C 13/40* (2013.01); *B66C 23/905* (2013.01)

(58) Field of Classification Search
CPC ......... B66C 13/46; B66C 23/36; B66C 13/40; G06T 19/006; G06T 2207/30164; G06T 7/73; G06V 10/245
See application file for complete search history.

(56) References Cited

U.S. PATENT DOCUMENTS

2016/0063709 A1* 3/2016 Booij ...................... B66C 23/52 348/142
2018/0282131 A1* 10/2018 Hayashi .................. B66C 13/44
(Continued)

FOREIGN PATENT DOCUMENTS

JP 2013-105328 A 5/2013
JP 2014-227281 A 12/2014

OTHER PUBLICATIONS

Nov. 10, 2020, International Search Report issued for related PCT application No. PCT/JP2020/036296.
(Continued)

*Primary Examiner* — Li Liu
(74) *Attorney, Agent, or Firm* — Paratus Law Group, PLLC

(57) ABSTRACT

A crane information display system includes a terminal device having a camera, and obtains camera images by imaging, with the camera, a first information display unit that displays information about a crane, the crane information display system including: a crane information acquisition unit that reads, from the camera images, display information of the first information display unit to acquire information about the crane; a virtual crane generation unit that generates a virtual crane image; a position/posture calculation unit that calculates, from the camera images, a position at which the virtual crane is to be disposed and a posture to be taken by the virtual crane; an information processing unit that converts the virtual crane image into an image that corresponds to the position and the posture of the virtual crane; and an image display unit that overlays and displays the virtual crane onto the camera images.

6 Claims, 5 Drawing Sheets

(56) References Cited

U.S. PATENT DOCUMENTS

| | | | | |
|---|---|---|---|---|
| 2019/0019430 A1* | 1/2019 | Steib | ........................ | G09B 9/05 |
| 2019/0094834 A1* | 3/2019 | Bramberger | ............ | G06F 30/13 |
| 2021/0072727 A1* | 3/2021 | Stanger | ................... | B66C 13/48 |

OTHER PUBLICATIONS

Nov. 10, 2020, International Search Opinion issued for related PCT application No. PCT/JP2020/036296.

Higuchi et al., Computer-Aided Planning Support System for Mobile Crane Lifts, IPSJ SIG Technical Report, Nov. 2005, pp. 61-66.

* cited by examiner

CRANE INFORMATION DISPLAY SYSTEM

CROSS REFERENCE TO PRIOR APPLICATION

This application is a National Stage Patent Application of PCT International Patent Application No. PCT/JP2020/036296 (filed on Sep. 25, 2020) under 35 U.S.C. § 371, which claims priority to Japanese Patent Application No. 2019-176782 (filed on Sep. 27, 2019), which are all hereby incorporated by reference in their entirety.

TECHNICAL FIELD

The present invention relates to a crane information display system.

BACKGROUND ART

Crane information display systems that display information about the cranes have been known (e.g., refer to Patent Literature 1).

Patent Literature 1 discloses a configuration that displays an operation state of a crane to an operator, and displays an operation state of a crane to a person outside the crane with a mobile terminal. Consequently, a person outside the crane can grasp an operation state of the crane.

CITATION LIST

Patent Literature

Patent Literature 1: JP 2014-227281A

SUMMARY OF THE INVENTION

Problems to be Solved by the invention

However, the configuration described in Patent Literature 1 simply displays an operation state of an actual crane, and has a problem that a work plan of the crane cannot be made without disposing the crane in a place in which the crane is going to be installed.

It is therefore an object of the present invention to provide a crane information display system that can make a work plan of a crane without disposing the crane in a place in which the crane is going to be installed.

Solutions to Problems

A main present disclosure that solves the problems described above is a crane information display system that includes a terminal device having a camera, and obtains a camera image by imaging, with the camera, a first information display unit that displays information about a crane, the crane information display system including:

a crane information acquisition unit that reads, from the camera image, display information of the first information display unit to acquire information about the crane;

a virtual crane generation unit that generates, on the basis of the information about the crane acquired by the crane information acquisition unit, image information about a virtual crane that corresponds to a three-dimensional image of the crane;

a position/posture calculation unit that reads, from the camera image, the display information of the first information display unit to acquire information about a reference shape of the first information display unit, and extracts, from the camera image, information about an outline shape of the first information display unit that appears in the camera image, and calculates, on the basis of the reference shape of the first information display unit and the information about the outline shape of the first information display unit, a position at which the virtual crane is to be disposed and a posture to be taken by the virtual crane in the camera image;

an information processing unit that converts the image information about the virtual crane generated by the virtual crane generation unit, into image information that corresponds to the position and the posture of the virtual crane calculated by the position/posture calculation unit; and an image display unit that overlays and displays, onto the camera image, the virtual crane to which the processing by the information processing unit that converts the image information has been applied.

Effects of the Invention

The crane information display system according to the present invention configured as described above can make a work plan of the crane without disposing the crane in a place in which the crane is going to be installed.

BRIEF DESCRIPTION. OF DRAWINGS

DESCRIPTION OF EMBODIMENTS

Figure 1:
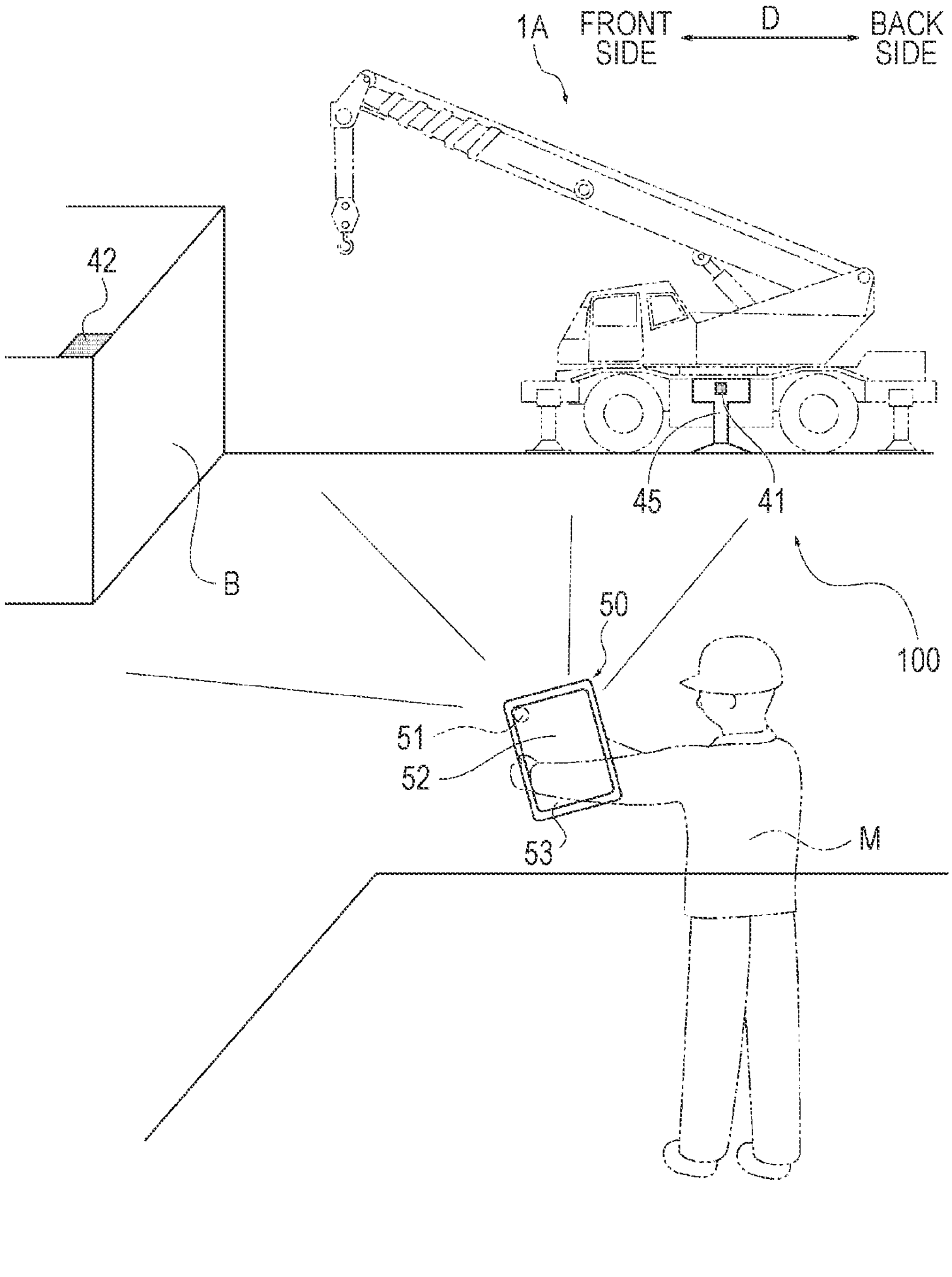
FIG. 1 is a drawing that illustrates a crane information display system according to a first embodiment.

Hereinafter, an embodiment that realizes a crane information display system according to the present invention will be described on the basis of a first embodiment illustrated in the drawings.

First Embodiment

[Configuration of Crane Information Display System]

Figure 2:
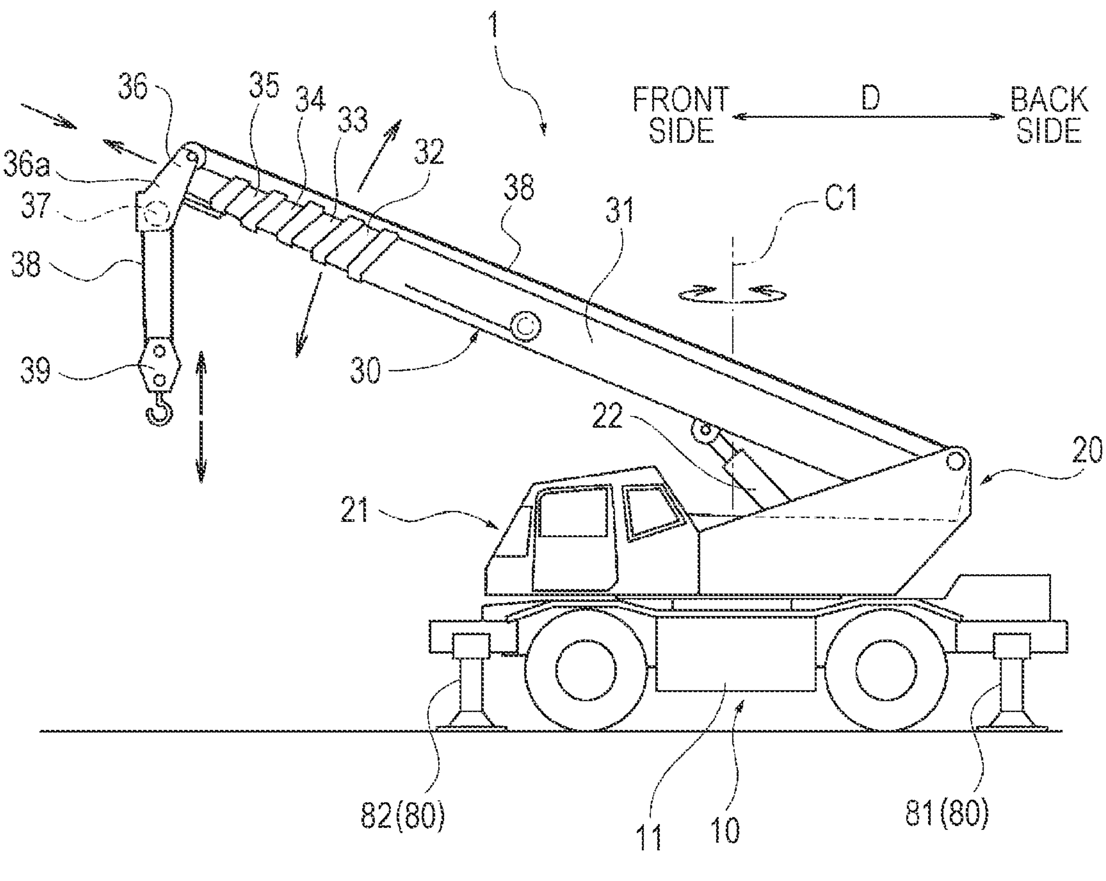
FIG. 2 is a side view that illustrates a crane according to the first embodiment.

FIG. 1 is a drawing that illustrates a crane information display system according to a first embodiment. FIG. 2 is a side view that illustrates a crane according to the first embodiment. Hereinafter, the configuration of the crane information display system according to the first embodiment will be described. Note that an actual crane is a crane 1, and a virtual crane is a virtual crane 1A. Further, forward and backward directions of the crane 1 are forward and backward directions D.

As illustrated in FIG. 1, a crane information display system 100 according to the first embodiment will be described about an example in which a worker M images, with a tablet terminal 50 as a user terminal that includes a camera 51, a work site in which the crane 1 is going to be installed.

[Configuration of Crane]

As illustrated in FIG. 2, the crane 1 includes a travelling body 10, a rotating body 20, and a boom 30.

The travelling body 10 includes a vehicle body frame 11, outriggers 80, a travelling device for travelling by itself a road and a work site, and the like.

The outriggers 80 include rear outriggers 81 attached to rear side surfaces of the vehicle body frame 11 of the travelling body 10, and front outriggers 82 attached to front side surfaces of the vehicle body frame 11. The outriggers 80 are accommodated in the vehicle body frame 11 at a time of travelling. On the other hand, the outriggers 80 protrude in a horizontal direction and a perpendicular direction at a time of work to lift the whole vehicle body and stabilize the posture.

The rotating body 20 is provided over the travelling body 10 and can rotate on a vertical axis C1 relative to the travelling body 10. The rotating body 20 includes a cabin 21. The cabin 21 includes an operation unit for controlling travel of the travelling body 10 (e.g., a steering wheel, a shift lever, an accelerator pedal, a brake pedal, and the like). Further, the cabin 21 includes an operation unit for operating the rotating body 20, the boom 30, a winch, and the like. A worker who has boarded the cabin 21 operates the operation unit to rotate the rotating body 20, raise and lower and extend and contract the boom 30, and turn the winch to perform work.

The base end side of the boom 30 is supported by the rotating body 20. The boom 30 is attached to the rotating body 20 in such a manner that the boom 30 can be raised and lowered relative to the rotating body 20. The boom 30 is raised and lowered by a raising and lowering cylinder 22 provided for the rotating body 20, and is extended and contracted by an extending and contracting cylinder (not illustrated).

The boom 30 includes intermediate booms 32 to 35 between a base end boom 31 on the base end side and a front end boom 36 on the front end side. The intermediate booms 32 to 35 and the front end boom 36 are telescopic to be accommodated sequentially in the base end boom 31.

A sheave 37 disposed at a boom head **36*a* provided at the front end of the front end boom 36. A wire rope 38 for a hung load is wound around the winch of the rotating body 20 provided near the base end of the boom 30. The wire rope 38 is disposed along an axis direction of the boom 30 from the winch to the sheave 37. The wire rope 38 wound around the sheave 37 is hung downward in a vertical direction from the sheave 37. A hook 39 it provided at a lowest portion of the wire rope 38**.

A load is hung on the hook 39, and the wire rope 38 wound around the winch is let out to lower the hook 39. The wire rope 38 is wound up to raise the hook 39.

The winch lets out and winds up the wire rope 38, the boom 30 is raised, lowered, extended, and contracted, and the rotating body 20 is rotated so that the crane 1 configured as described above moves a load hung from the hook 39 to a predetermined position.

[Configuration of Tablet Terminal]

As illustrated in FIG. 1, the tablet terminal 50 includes the camera 51, an image display unit 52, and an input unit 53.

An image imaged with the camera 51 is displayed on the image display unit 52. The image display unit 52 is also configured as a touch panel as the input unit 53.

[Configuration of First Information Display Unit]

As illustrated in FIG. 1, a first information display unit 41 (that is to say, a marker) is attached to a support member 45, such as a standing signboard. The support member 45 to which the first information display unit 41 is attached is installed in a place in which the crane 1 is going to be installed.

The first information display unit 41 may be an AprilTag. In the first information display unit 41, information about the machine type of the crane 1, the shape and size of the first information display unit 41, and information about a predetermined position of the crane 1 are stored. The information about the predetermined position of the crane 1 may be the center of the left side surface of the vehicle body frame 11 of the travelling body 10.

[Configuration of Second Information Display Unit]

As illustrated in FIG. 1, a second information display unit 42 (that is to say, a marker) is installed at a position onto which the crane 1 is going to unload a hung load, e.g., a rooftop of a building B. The second information display unit 42 may be an AprilTag. In the second information display unit 42, the shape and size of the second information display unit 42 are stored. The first information display unit 41 and the second information display unit 42 have different display information (that is to say, code information) due to, for example, characters, marks, signs, patterns, or the like provided for the surfaces of the first information display unit 41 and the second information display unit 42.

The display information (that is to say, code information) that the first information display unit 41 and the second information display unit 42 have respectively can be read from a camera image generated by the camera 51, using a decipherment program preliminarily stored in a control unit 60 (described below), or the like. Further, the first information display unit 41 and the second information display unit 42 can be identified from the display information (that is to say, code information) that the first information display unit 41 and the second information display unit 42 have respectively. Note that the shapes and sizes stored in the first information display unit 41 and the second information display unit 42 are, for example, the shapes and sizes obtained when the first information display unit 41 and the second information display unit 42 are imaged from the fronts at a predetermined distance (hereinafter referred to as “reference shapes” and “reference sizes”).

[Functional Configuration of Crane Information Display System]

Figure 3:
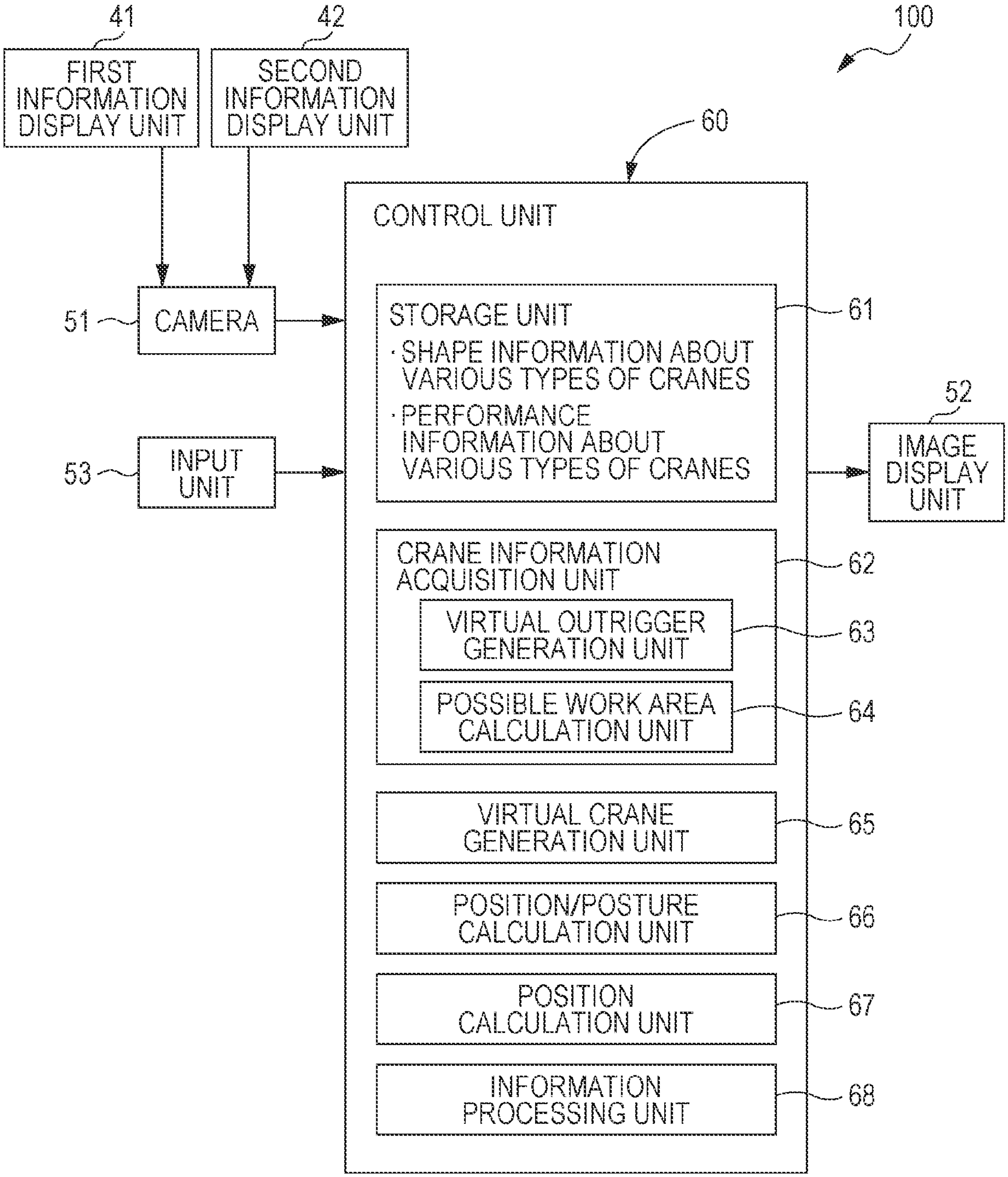
FIG. 3 is a block diagram that illustrates a functional configuration of the crane information display system according to the first embodiment.
Figure 4:
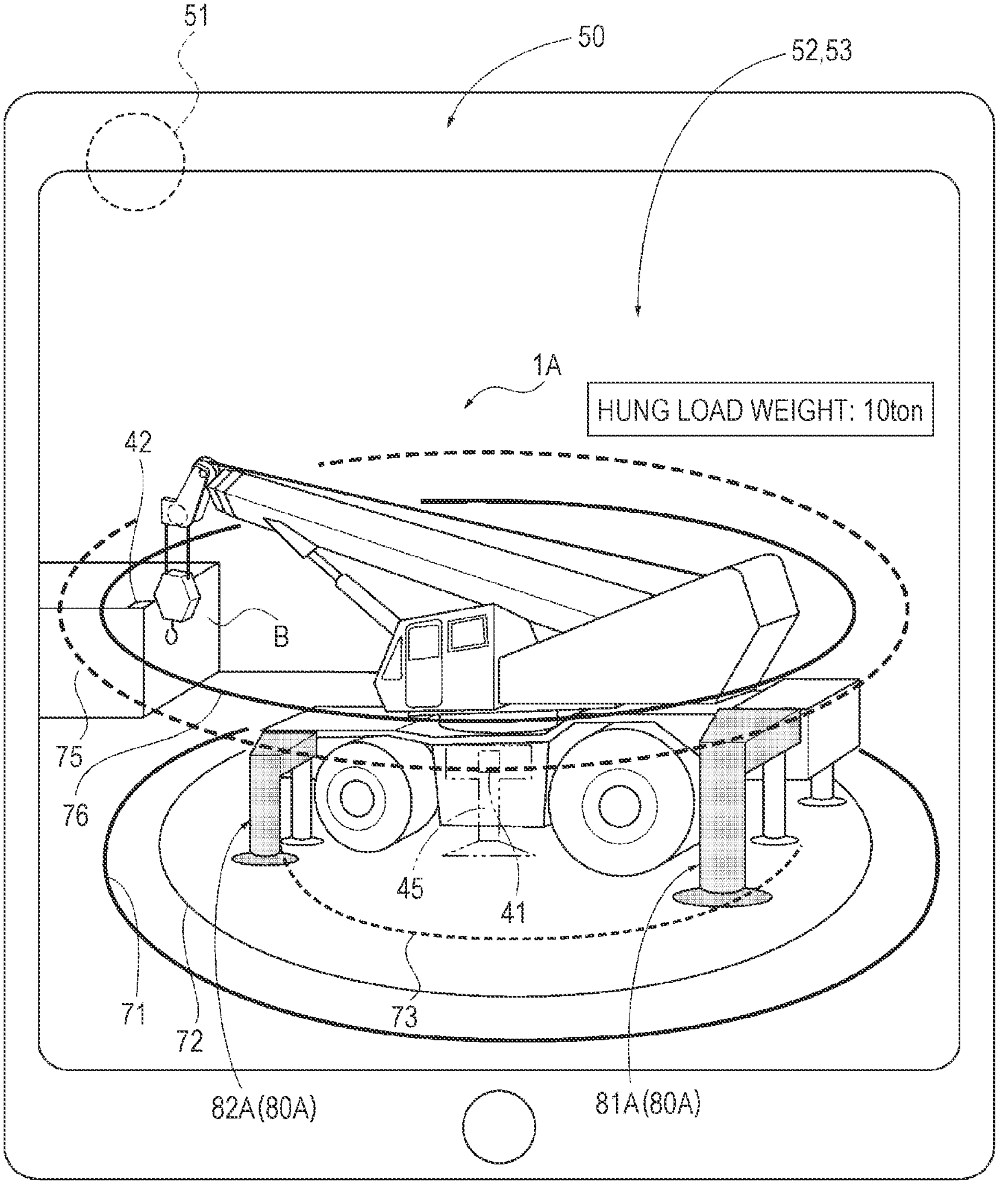
FIG. 4 is a drawing that illustrates an image displayed on an image display unit according to the first embodiment.

FIG. 3 is a block diagram that illustrates a functional configuration of the crane information display system 100 according to the first embodiment. FIG. 4 is a drawing that illustrates an image displayed on the image display unit 52 according to the first embodiment. Hereinafter, the functional configuration of the crane information display system 100 according to the first embodiment will be described.

As illustrated in FIG. 3, the crane information display system 100 is such that an image of the first information display unit 41 imaged with the camera 51, an image of the second information display unit 42 imaged with the camera 51, and input information input into the input unit 53 are input into the control unit 60 (in the present embodiment, a control unit incorporated in the tablet terminal 50), and information controlled by the control unit 60 is output on the image display unit 52.

The camera 51 may be, for example, the camera 51 that the tablet terminal 50 that is common includes. The camera 51 can image a work site in which the crane 1 is going to be installed, the first information display unit 41, and the second information display unit 42.

A protrusion amount by which the outriggers 80 protrude in a horizontal direction, a hung load weight, the length of the boom 30, and the like can be input into the input unit 53. The length of the boom 30 is the length of the boom 30 in a state in which the front end boom 36 and the intermediate booms 32 to 35 are accommodated in the base end boom 31 (a completely contracted state), the length of the boom 30 in a state in which the front end boom 36 extends, the length of the boom 30 in a state in which the front end boom 36 and the intermediate booms 32 to 35 extend (a completely extending state), or the like.

The control unit 60 includes a storage unit 61, a crane information acquisition unit 62, a virtual crane generation unit 65, a position/posture calculation unit 66, a position calculation unit 67, and an information processing unit 68. Note that the control unit 60 is, for example, a widely-known microcomputer that includes a central processing unit (CPU), random access memory (RAM), read only memory (ROM), and the like. The functions of the control unit 60 (the crane information acquisition unit 62, the virtual crane generation unit 65, the position/posture calculation unit 66, and the position calculation unit 67, and the information processing unit 68) are realized by, for example, the CPU referring to control programs and various data stored in the storage unit 61 (e.g., a hard disk drive (HDD), the ROM, or the RAM).

The storage unit 61 stores shape information about various types of cranes, and performance information about various types of cranes. The performance information includes, for example, information regarding the shapes of the outriggers 80, information regarding possible work area in a horizontal direction and information regarding possible work area in a height direction that correspond to the protrusion amount of the outriggers 80 and the length of the boom 30, information regarding a range of angles by which the boom is raised or lowered, information regarding load ratios, information regarding a tail swing area, and the like.

On the basis of the first information display unit 41 imaged with the camera 51, the crane information acquisition unit 62 acquires information about the machine type of the crane 1, and acquires, from the storage unit 61, shape information and performance information about the acquired machine type of the crane 1. That is to say, the crane information acquisition unit 62 reads into the first information display unit 41 imaged with the camera 51 (that is to say, reads display information of the first information display unit 41 from the camera image), acquires the machine type of the crane 1, and acquires, from the storage unit 61, shape information and performance information about the acquired machine type.

The crane information acquisition unit 62 includes a virtual outrigger generation unit 63, and a possible work area calculation unit 64.

On the basis of information regarding the shapes of the outriggers 80 stored in the storage unit 61 (that is to say, the shapes of the outriggers 80 that correspond to the machine type of the crane 1 specified from display information of an information display unit 40), and a protrusion amount by which the outriggers 80 protrude in a horizontal direction that has been input into the input unit 53, the virtual outrigger generation unit 63 generates three-dimensional data on virtual outriggers 80A, as information about the crane 1.

The possible work area calculation unit 64 refers to information about the machine type of the crane 1 specified from the display information of the information display unit 40, and calculates possible work area of the crane 1, as information about the crane 1, on the basis of a hung load weight and the length of the boom 30 input into the input unit 53. The possible work area calculation unit 64 can calculate possible work area for a plurality of load ratios. In the first embodiment, the possible work area calculation unit 64 calculates a possible work area for a load ratio of 80%, and a possible work area for a load ratio of 100%. Note that the possible work area is an area in which the crane 1 can work in a horizontal direction, in a plane in which the crane 1 is installed.

The virtual crane generation unit 65 generates three-dimensional data on a virtual crane 1A, on the basis of the information about the crane 1 acquired by the crane information acquisition unit 62.

The position/posture calculation unit 66 calculates the position and posture of the virtual crane 1A (that is to say, the position at which the virtual crane 1A is to be disposed and the posture to be taken by the virtual crane 1A in the image of the camera 51) on the basis of the first information display unit 41 imaged with the camera 51.

More specifically, the position/posture calculation unit 66 acquires information about the posture of the virtual crane 1A, on the basis of the shape of the first information display unit 41 imaged with the camera 51 (hereinafter referred to as an "outline shape of the information display unit 40"), and the reference shape of the first information display unit 41 stored in the first information display unit 41. That is to say, the position/posture calculation unit 66 reads, from an image of the camera 51, display information (that is to say, code information) of the first information display unit 41 to acquire information regarding the reference shape of the first information display unit 41, and extracts, from the image of the camera 51, an outline shape of the first information display unit 41 that appears in the camera 51 by publicly-known pattern matching, or the like. Then the position/posture calculation unit 66 compares the outline shape of the first information display unit 41 that appears in the image of the camera 51, with the reference shape of the first information display unit 41 to calculate the position at which the virtual crane 1A is to be disposed and the posture to be taken by the virtual crane 1A in the image of the camera 51.

For example, if the shape of the first information display unit 41 imaged with the camera 51 is a rectangular shape stored in the first information display unit 41 (that is to say, if the outline shape of the first information display unit 41 that appears in the image of the camera 51 and the reference shape of the first information display unit 41 specified from the display information of the first information display unit 41 are both a rectangular shape), the posture is such that the left side surface of the virtual crane 1A is right in front of the camera 51. For example, if the shape of the first information display unit 41 imaged with the camera 51 is not a rectangular shape stored in the first information display unit 41 but is a trapezoid such that the left edge of the information display unit 40 is longer (higher) than the right edge (that is to say, if the outline shape of the first information display unit 41 that appears in the image of the camera 51 is a trapezoid that has a left edge longer than the right edge, and the reference shape of the first information display unit 41 specified from the display information of the first information display unit 41 is a rectangular shape), the posture is such that the left side surface of the virtual crane 1A slightly faces left from right in front of the camera 51. If the first information display unit 41 imaged with the camera 51 does not have a rectangular shape stored in the first information display unit 41 but is trapezoidal such that the right edge of the first information display unit 41 is longer than the left edge (that is to say, if the outline shape of the first information display unit 41 that appears in the image of the camera 51 is a trapezoid that has a right edge longer than the left edge, and the reference shape of the first information display unit 41 specified from the display information of the first information display unit 41 is a rectangular shape), the posture is such that the left side surface of the virtual crane 1A slightly faces right from right in front of the camera 51.

That is to say, the position/posture calculation unit 66 compares the outline shape of the first information display unit 41 imaged with the camera 51, with the reference shape of the first information display unit 41 stored in the first information display unit 41 to acquire information about the posture of the virtual crane 1A.

Further, the position/posture calculation unit 66 acquires information about the position of the virtual crane 1A, on the basis of the size of the outline shape of the first information display unit 41 imaged with the camera 51, and the reference size of the first information display unit 41 stored in the first information display unit 41. More specifically, the position/posture calculation unit 66 compares the reference size of the first information display unit 41 stored in the first information display unit 41 with the size of the outline shape of the first information display unit 41 imaged with the camera 51 to calculate the distance from the camera 51 to the first information display unit 41.

The position calculation unit 67 calculates information about a relative position of the second information display unit 42 from the first information display unit 41, on the basis of the second information display unit 42 imaged with the camera 51. More specifically, the position calculation unit 67 reads into the second information display unit 42 imaged with the camera 51 (that is to say, reads, from the image of the camera 51, display information of the second information display unit 42), and calculates the distance and direction from the first information display unit 41, with the position of the first information display unit 41 as the reference. That is to say, the position calculation unit 67 calculates information about the distance of the second information display unit 42 in a horizontal direction, and information about the distance of the second information display unit 42 in a height direction, with the first information display unit 41 as the reference.

More specifically, the position calculation unit 67 functions in a state in which the first information display unit 41 and the second information display unit 42 both appear in an image of the camera 51. For example, the position calculation unit 67 acquires the reference shape of the second information display unit 42, extracts an outline shape of the second information display unit 42 that appears in an image of the camera 51, and specifies the position of the second information display unit 42 in the image of the camera 51, on the basis of information about the reference shape of the second information display unit 42, and the outline shape of the second information display unit 42. Then the position calculation unit 67 refers to the position of the first information display unit 41 in the image of the camera 51 calculated by the position/posture calculation unit 66, and the position of the second information display unit 42 in the image of the camera 51 calculated by the position calculation unit 67 to calculate information about the relative position of the second information display unit 42 from the first information display unit 41. However, if the positional relationship between an image of the camera 51 in which a first information display unit 41 appears and an image of the camera 51 in which a second information display unit 42 appears is specified by simultaneous localization and mapping (SLAM) technology or the like, the function of the position calculation unit 67 can be realized even if the first information display unit 41 and the second information display unit 42 both do not appear in one image.

The information processing unit 68 processes the virtual crane 1A generated by the virtual crane generation unit 65, into information that corresponds to the position and posture of the virtual crane 1A calculated by the position/posture calculation unit 66. In other words, the information processing unit 68 converts image information about the virtual crane 1A generated by the virtual crane generation unit 65, into image information that corresponds to the position at which the virtual crane 1A is to be disposed and the posture to be taken by the virtual crane 1A in an image of the camera 51 calculated by the position/posture calculation unit 66. For example, the information processing unit 68 converts image information about the virtual crane 1A in such a manner that when a position at which the crane is going to be installed (that is to say, a position at which the first information display unit 41 is installed) is seen from the imaging position of the camera 51, a three-dimensional image of the virtual crane 1A becomes an image that simulates a state in which the crane 1 actually exists. Note that such image processing by the information processing unit 68 is realized by publicly-known coordinate conversion processing or the like.

Further, the information processing unit 68 processes the performance information about the crane 1 acquired by the crane information acquisition unit 62, the virtual outriggers 80A generated by the virtual outrigger generation unit 63, and the possible work area of the crane 1 calculated by the possible work area calculation unit 64, into information that corresponds to the position and posture of the virtual crane 1A calculated by the position/posture calculation unit 66. That is to say, the information processing unit 68 processes the information about the crane 1 acquired by the crane information acquisition unit 62, into information that corresponds to the position and posture of the virtual crane 1A calculated by the position/posture calculation unit 66.

Further, on the basis of the position information calculated by the position calculation unit 67, the information processing unit 68 processes the information about the crane 1 acquired by the crane information acquisition unit 62, into information that corresponds to the position and posture of the virtual crane 1A calculated by the position/posture calculation unit 66, with the second information display unit 42 as the reference. In other words, the information processing unit 68 processes the information about the crane 1 that has been made to correspond to the position and posture of the virtual crane 1A calculated by the position/posture calculation unit 66, into information with the second information display unit 42 as the reference. That is to say, on the basis of the relative position of the second information display unit 42 from the first information display unit 41 calculated by the position calculation unit 67, the information processing unit 68 converts the information about the crane 1 acquired by the crane information acquisition unit 62 (for example, possible work area 75 and 76 of the crane 1), into three-dimensional image information in which the information about the crane 1 acquired by the crane information acquisition unit 62 (for example, the possible work area 75 and 76 of the crane 1) corresponds to a work position at a time when the crane 1 unloads a hung load.

The image display unit 52 overlays and displays the information processed by the information processing unit 68 onto an image of the camera 51. More specifically, as illustrated in FIG. 4, the image display unit 52 superimposes and displays, on an image of a work site imaged with the camera 51 in which the crane 1 is going to be installed, the virtual crane 1A, a tail swing area 73 or the crane 1 acquired by the crane information acquisition unit 62, the virtual outriggers 80A generated by the virtual outrigger generation unit 63, possible work area 71 and 72 in a plane in which the crane 1 is installed that has been calculated by the possible work area calculation unit 64, and possible work area 75 and 76 of the crane 1 at the height at which the second information display unit 42 is disposed. Further, the image display unit 52 displays a hung load weight input into the input unit 53.

The virtual outriggers 80A include virtual front outriggers 82A and virtual rear outriggers 81A. The possible work area in a plane in which the crane 1 is installed include the possible work area 72 for a load ratio of 80%, and the possible work area 71 for a load ratio of 100%. The possible work area at the height at which the second information display unit 42 is disposed include the possible work area 76 for a load ratio of 80%, and the possible work area 75 for a load ratio of 100%.

That is to say, to allow a three-dimensional examination on how each portion of the crane 1 affects a site environment when a user actually operates the crane 1 in the site, the image display unit 52 displays the virtual crane 1A, the possible work area 71 and 72 (75 and 76) of the crane 1, the virtual outriggers 80A, and the tail swing area 73 of the crane 1 in a three-dimensional image in such manner that the virtual crane 1A, the possible work area 71 and 72 (75 and 76) of the crane 1, the virtual outriggers 80A, and the tail swing area 73 of the crane 1 are overlaid onto a surrounding environment that appears in an image of the camera 51. Note that the image display unit 52 displays the virtual outriggers 80A at, for example, the positions of outriggers of the virtual crane 1A in an image of the camera 51. Further, the image display unit 52 displays the possible work area 71 and 72 of the crane 1 around the virtual crane 1A as the center, in an image of the camera 51, for example. Further, the image display unit 52 displays the tail swing area 73 of the crane 1 around a rotation mount of the virtual crane 1A as the center, in an image of the camera 51, for example.

[Process of Processing by Control Unit]

Figure 5:
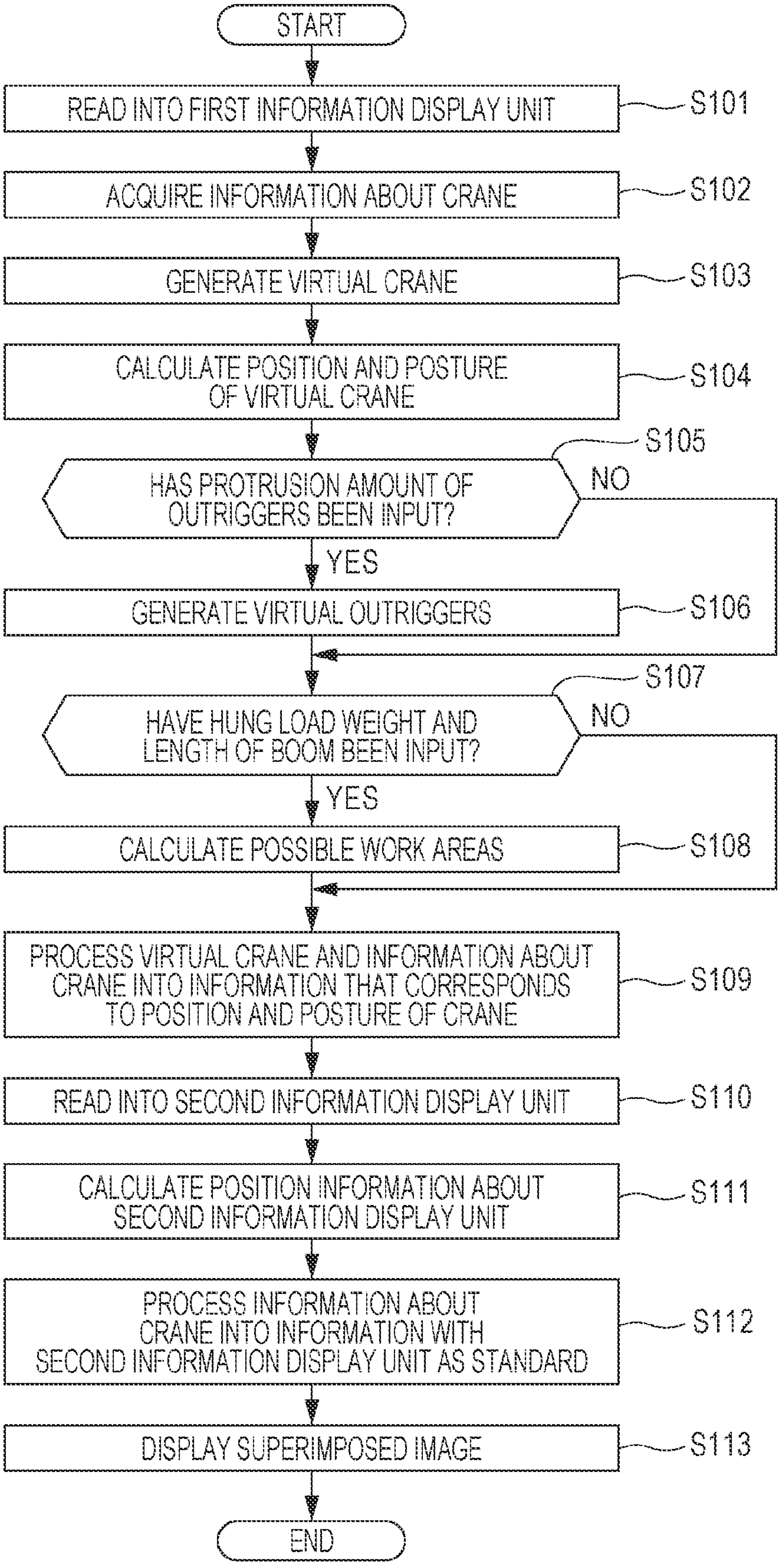
FIG. 5 is a flowchart that illustrates a process of processing by a control unit of the crane information display system according to the first embodiment.

FIG. 5 is a flowchart that illustrates a process of processing by the control unit 60 of the crane information display system 100 according to the first embodiment. Hereinafter, the process of processing by the control unit 60 of the crane information display system 100 according to the first embodiment will be described.

When a worker M images, with the camera 51 attached to the tablet terminal 50, the first information display unit 41 attached to the support member 45 installed in a work site in which the crane 1 is going to be installed, and a site environment around the first information display unit 41, the crane information acquisition unit 62 reads into the first information display unit 41 imaged with the camera 51, as illustrated in FIG. 5 (step S101).

Next, the crane information acquisition unit 62 acquires, from the storage unit 61, shape information and performance information about the machine type of the crane 1 that has been acquired (step S102).

Next, the virtual crane generation unit 65 generates three-dimensional data on virtual outriggers, on the basis of information about the crane 1 acquired by the crane information acquisition unit 62 (step S103).

Next, the position/posture calculation unit 66 calculates the position and posture of a virtual crane 1A, on the basis of the first information display unit 41 imaged with the camera 51 (step S104).

Next, the control unit 60 determines whether or not a protrusion amount of the outriggers 80 has been input into the input unit 53 (step S105). If it is determined that a protrusion amount of the outriggers 80 has been input into the input unit 53 (YES in step S105), the virtual outrigger generation unit 63 generates virtual outriggers 80A (step S106), and the processing proceeds to step S107. On the other hand, if a protrusion amount of the outriggers 80 has not been input into the input unit 53, (NO in step S105), the processing proceeds to step S107.

Next, the control unit 60 determines whether or not a hung load weight and the length of the boom 30 have been input into the input unit 53 (step S107). If it is determined that a hung load weight and the length of the boom 30 have been input into the input unit 53 (YES in step S107), the possible work area calculation unit 64 calculates possible work area 71 and 72 (step S108), and the processing proceeds to step 109. On the other hand, if it is determined that a hung load weight and the length of the boom 30 have not been input into the input unit 53 (NO in step S108), the processing proceeds to step S109.

Further, the information processing unit 68 processes the virtual outriggers 80A generated by the virtual outrigger generation unit 63, and the information about the crane 1 acquired by the crane information acquisition unit 62, into information that corresponds to the position and posture of the crane 1 calculated by the position/posture calculation unit 66 (step S109).

Next, the position calculation unit 67 reads into the second information display unit 42 imaged with the camera 51 (step S110).

Next, the position calculation unit 67 calculates position information about the second information display unit 42 from the first information display unit 41 (step S111).

Next, on the basis of the position information calculated by the position calculation unit 67, the information processing unit 68 processes the information about the crane 1 acquired by the crane information acquisition unit 62, into information that corresponds to the position and posture of the virtual crane 1A calculated by the position/posture calculation unit 66, with the second information display unit 42 as the reference (step S112).

Next, the image display unit 52 superimposes and displays, on an image of a work site imaged with the camera 51 in which the crane 1 is going to be installed, the virtual crane 1A, a tail swing area 73 of the crane 1 acquired by the crane information acquisition unit 62, the virtual outriggers 80A generated by the virtual outrigger generation unit 63, possible work area 71 and 72 is a plane in which the virtual crane 1A is installed, and possible work area 75 and 76 at the height at which the second information display unit 42 is disposed (step S113), and the processing is ended.

If an installation place of the crane 1 is examined, and the installation place of the crane 1 is determined in this way, the crane 1 is carried and installed in such a manner that a predetermined position of the actual crane 1 (e.g., the center of the left side surface of the vehicle body frame 11 of the travelling body 10) is made to correspond to the first information display unit 41 attached to the support member 45 put in the work site.

[Effects of Crane Information Display System]

Hereinafter, effects of the crane information display system 100 according to the first embodiment will be described.

The crane information display system 100 according to the first embodiment includes the crane information acquisition unit 62 that images, with the camera 51, the first information display unit 41 that displays information about the crane 1 to acquire the information about the crane 1, the virtual crane generation unit 65 that generates a virtual crane 1A of the crane 1 that is three-dimensional, on the basis of the information about the crane 1 acquired by the crane information acquisition unit 62, the position/posture calculation unit 66 that calculates the position and posture of the virtual crane 1A, on the basis of the first information display unit 41 imaged with the camera 51, the information processing unit 68 that processes the virtual crane 1A generated by the virtual crane generation unit 65, into information that corresponds to the position and posture of the virtual crane 1A calculated by the position/posture calculation unit 66, and the image display unit 52 that overlays and displays the information processed by the information processing unit 68 onto the image imaged with the camera 51 (FIGS. 3 and 4).

Consequently, the virtual crane 1A can be disposed and displayed in a scenery image of a place in which the crane 1 is going to be installed. Therefore, disposition of the crane 1 can be examined in a three-dimensional image without actually disposing the crane 1 in a place in which the crane 1 is going to be installed. As a result, a work plan of the crane 1 can be easily examined.

In the crane information display system 100 according to the first embodiment, the information processing unit 68 processes information about the crane 1 acquired by the crane information acquisition unit 62, into information that corresponds to the position and posture of a virtual crane 1A calculated by the position/posture calculation unit 66 (FIGS. 3 and 4).

Consequently, the information about the crane 1 can be overlaid and displayed onto an image in which the virtual crane 1A is disposed. Therefore, the virtual crane 1A, a site environment around the virtual crane 1A, and the information about the crane 1 can be checked in a three-dimensional image in real time. As a result, a work plan of the crane 1 can be easily examined without disposing the actual crane 1 a place in which the crane 1 is going to be installed.

In the crane information display system 100 according to the first embodiment, the second information display unit 42 provided and disposed at a position onto which the crane 1 unloads a hung load, the second information display unit 42 is imaged with the camera 51, the position calculation unit 67 calculates position information about the second information display unit 42 from the first information display unit 41, and the information processing unit 68 processes, on the basis of the position information calculated by the position calculation unit 67, information about the crane 1 acquired by the crane information acquisition unit 62, into information that corresponds to the position and posture of a virtual crane 1A calculated by the position/posture calculation unit 66, with the second information display unit 42 as the reference (FIGS. 3 and 4).

Consequently, possible work area 75 and 76 at the height at which the second information display unit 42 is installed can be displayed. Therefore, for example, if work that unloads a hung load is performed at a high position, such as a rooftop of a building B, as illustrated in FIG. 4, possible work area 75 and 76 of the crane 1 at the height at which the second information display unit 42 is installed can be displayed. As a result, even if a position onto which a hung load is unloaded is at a height different from the height of a plane in which the crane 1 is installed, a work plan of the crane 1 can be easily examined.

In the crane information display system 100 according to the first embodiment, the input unit 53 into which a protrusion amount of the outriggers 80 of a virtual crane 1A is input is provided, and the crane information acquisition unit 62 includes the virtual outrigger generation unit 63 that generates three-dimensional virtual outriggers 80A, on the basis of the input value input into the input unit 53 (FIGS. 3 and 4).

Consequently, the virtual outriggers 80A of a protrusion amount that corresponds to the input value can be overlaid and displayed onto an image in which the virtual crane 1A disposed in a place in which the crane 1 is going to be installed, and the surroundings around the virtual crane 1A are imaged. Therefore, a protrusion amount of the outriggers 80 can be checked in a three-dimensional image in real time in the work site.

In the crane information display system 100 according to the first embodiment, the input unit 53 into which a hung load weight and the length of the boom 30 of the crane 1 are input is provided, and the crane information acquisition unit 62 includes the possible work area calculation unit 64 that calculates possible work area 71 and 72 of the crane 1, on the basis of the input values input into the input unit 53 (FIGS. 3 and 4).

Consequently, the possible work area 71 and 72 for a predetermined hung load weight can be overlaid and displayed, on the basis of the length of the boom 30, onto an image in which a virtual crane 1A disposed in a place in which the crane 1 is going to be installed and the surroundings around the virtual crane 1A are imaged. Therefore, the possible work area 71 and 72 can be checked in a three-dimensional image in real time in the work site.

In the crane information display system 100 according to the first embodiment, information about the crane 1 includes a tail swing area 73 of the crane 1 (FIGS. 3 and 4).

Consequently, the tail swing area 73 can be overlaid and displayed onto an image in which a virtual crane 1A disposed in a place in which the crane 1 is going to be installed and the surroundings around the virtual crane 1A are imaged. Therefore, the tail swing area 73 can be checked in a three-dimensional image in real time in the work site.

The crane information display system according to the present invention has been described above on the basis of the first embodiment. However, specific configurations are not limited to the embodiment, but design changes, addition, and the like are allowed unless the design changes, addition, and the like depart from the gist of the invention according to each of the claims.

In the first embodiment, an example is shown in which information about a predetermined position of the crane 1 stored in the first information display unit 41 is the center of the left side surface of the vehicle body frame 11 of the travelling body 10. However, information about a predetermined position of the crane 1 stored in the first information display unit 41 is not limited to the center of the left side surface of the vehicle body frame 11. Further, in addition to the left side surface of the vehicle body frame 11, the front surface, the back surface, and the right side surface of the vehicle body frame 11 may be stored as information about predetermined positions of the crane 1 stored in the first information display unit 41, and a worker M may appropriately perform the selection with the input unit 53.

In the first embodiment, an example is shown in which information about the machine type of the one crane 1 is stored in the first information display unit 41. However, information about a plurality of machine types of cranes may be stored in the first information display unit 41, and a worker M may appropriately perform the selection with the input unit 53.

In the first embodiment, an example is shown in which the information display unit 40 is an AprilTag. However, an information display unit is not limited to the aspect, but may be, for example, a two-dimensional code, such as a QR code (registered trademark). Further, an information display unit may be a crane itself, and information about the crane may be acquired by image recognition using deep learning.

In the first embodiment, an example is shown in which the possible work area 72 and 76 for a load ratio of 80%, and the possible work area 71 and 75 for a load ratio of 100% are displayed on the image display unit 52. However, one possible work area may be displayed, or three or more possible work area may be displayed on an image display unit. Further, load ratios of possible work area are not limited to 80% and 100%.

In the first embodiment, an example is shown in which a user terminal is the tablet terminal 50 that includes the camera 51, the input unit. 53, and the image display unit 52. However, the user terminal may be a smartphone. Further, the user terminal may include a camera and an image display unit that are separate.

In the first embodiment, an example is shown in which shape information and performance information of the crane 1 are stored in the storage unit 61. However, shape information and performance information of a crane may be stored in the first information display unit.

REFERENCE SIGNS LIST

1 crane
1A virtual crane
41 first information display unit
42 second information display unit
50 tablet terminal
51 camera
52 image display unit
62 crane information acquisition unit
63 virtual outrigger generation unit
64 possible work area calculation unit
65 virtual crane generation unit
66 position/posture calculation unit
67 position calculation unit
68 information processing unit
71, 72 possible work area
75, 76 possible work area
73 tail swing area
80A virtual outriggers
100 crane information display system

The invention claimed is:

1. A crane information display system comprising:

a first information display device that is installed at a location where a crane is scheduled to be installed and that displays information about the crane, by characters, marks, signs or patterns provided for the surfaces thereof, and a terminal device that mounts a camera to obtain a camera image by imaging, with the camera, the first information display device, wherein the terminal device comprises a hardware processor configured to read, from the camera image, display information of the first information display device to acquire information about the crane, generate, on a basis of the acquired information about the crane, image information about a virtual crane that corresponds to a three-dimensional image of the crane, read, from the camera image, the display information of the first information display device to acquire information about a reference shape of the first information display device, and extract, from the camera image, information about an outline shape of the first information display device that appears in the camera image, and calculate, on a basis of the reference shape of the first information display device and the information about the outline shape of the first information display device, a position at which the virtual crane is to be disposed and a posture to be taken by the virtual crane in the camera image, convert the generated image information about the virtual crane into image information that corresponds to the calculated position and the posture of the virtual crane, and overlay and display, onto the camera image, the virtual crane about which the image information has been converted.

2. The crane information display system according to claim 1, wherein the hardware processor is further configured to convert the acquired information about the crane into a three-dimensional image information that corresponds to the calculated position and the posture of the virtual crane, and display, on the camera image, the virtual crane about which the image information has been converted.

3. The crane information display system according to claim 2, further comprising a second information display device that is installed at a position onto which the crane is scheduled to unload a hung load, wherein the hardware processor is further configured to read, from the camera image, display information of the second information display device disposed at a position onto which the crane is going to unload a hung load to acquire a reference shape of the second information display device, and extract, from the camera image, information about an outline shape of the second information display device that appears in the camera image, and calculate, on a basis of the reference shape of the second information display device and the information about the outline shape of the second information display device, a relative position of the second information display device from the first information display device, and convert, on a basis of the relative position of the second information display device from the first information display device, the acquired information about the crane, into the three-dimensional image information that corresponds to a work position at a time when the crane unloads the hung load.

4. The crane information display system according to claim 2, wherein the terminal device further comprises an input device into which a protrusion amount of an outrigger of the virtual crane is input, and wherein the hardware processor is further configured to generate, on a basis of information about an outrigger of the crane specified from the display information of the first information display device, and an input value input into the input device, image information about a virtual outrigger that corresponds to a three-dimensional image of the outrigger, as information about the crane as a display object.

5. The crane information display system according to claim 2, wherein the terminal device further comprises an input device into which a hung load weight and a length of a boom of the crane are input, and wherein the hardware processor is further configured to calculate a possible work area of the crane as information about the crane as a display object, on a basis of information about a machine type of the crane specified from the display information of the first information display device, and input values input into the input device.

6. The crane information display system according to claim 1, wherein the information about the crane includes information about a tail swing area of the crane.

* * * * *